United States Patent [19]

Tsukada et al.

[11] Patent Number: 5,186,593
[45] Date of Patent: Feb. 16, 1993

[54] FEEDING METHOD FOR WORK PRODUCTS AND APPARATUS THEREOF

[75] Inventors: Shinichi Tsukada, Iwatsuki; Yoshiharu Iizuka, Kasukabe; Hideyuki Tamura, Chiba; Osamu Sakashita, Kasukabe, all of Japan

[73] Assignee: Hokkai Can Co., Ltd., Tokyo, Japan

[21] Appl. No.: 740,891

[22] Filed: Aug. 6, 1991

[30] Foreign Application Priority Data

Aug. 6, 1990 [JP] Japan .............................. 2-207878
Sep. 28, 1990 [JP] Japan .............................. 2-261174
Oct. 8, 1990 [JP] Japan .............................. 2-271917

[51] Int. Cl.⁵ .............................. B21D 51/46
[52] U.S. Cl. .............................. 413/19; 414/790.2; 198/347.3; 413/9
[58] Field of Search .............................. 198/347.3, 419.3; 413/9, 12, 14-17, 58, 62, 66, 67; 414/790.2; 72/361, 422, 424, 428

[56] References Cited

U.S. PATENT DOCUMENTS

| | | | |
|---|---|---|---|
| 3,762,579 | 10/1973 | Schade | 414/790.2 |
| 3,827,582 | 8/1974 | Lederer | 198/419.1 |
| 4,211,335 | 7/1980 | Langseder | 413/12 |
| 4,541,763 | 9/1985 | Chandoke | 414/790.2 |
| 4,808,057 | 2/1989 | Chiappe | 198/347.3 |
| 4,832,167 | 5/1989 | Fluck | 198/419.1 |
| 4,921,088 | 5/1990 | Terhorst | 198/419.1 |

Primary Examiner—Bruce M. Kisliuk
Assistant Examiner—Jack Lavinder

[57] ABSTRACT

A method of feeding work products such as can ends between different processes having different throughput requirements uses various feeding apparatus. In the first process, the work products are continuously mechanically treated at the same time by a group of first machines and then continuously discharged to a second process. This second process receives the work products fed from the plural discharging parts of the first machines. The apparatus in the second process has fewer receiving inlets than discharge parts of the first machines. In the second process, the work products are further mechanically treated. The method feeds the work products discharged from the plural discharging parts in the first process along respective feeding paths and then quickly feeds a predetermined number of work products to form a group of work products. This group is held in an arranged state in respective stay parts connected to the feeding paths. A robot system will then successively feed the work groups to the feeding part for the second process. Alternatively, the method can be arranged such that a certain process having a high output can feed to various machines of a subsequent process having a lower ouput. Various feeding apparatus can be used in order to divide the products from the certain process having the higher output into appropriate groups to be fed to the various machines of the subsequent slower process.

9 Claims, 8 Drawing Sheets

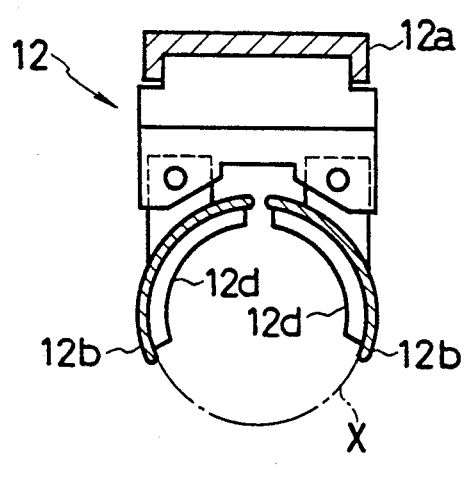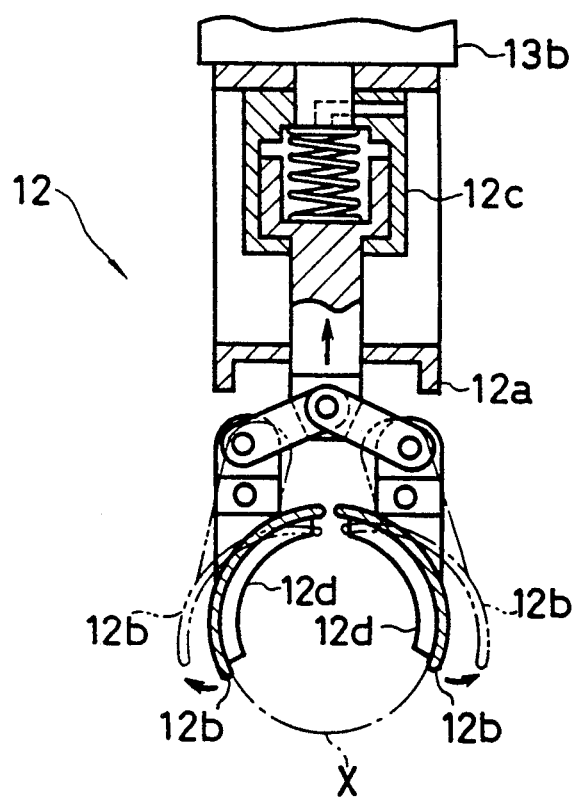

FEEDING METHOD FOR WORK PRODUCTS AND APPARATUS THEREOF

BACKGROUND OF THE INVENTION

The present invention relates to a method of feeding works and an apparatus thereof. In particular, this invention is concerned with a feeding method of can ends in a line for machining and processing the can ends, and an apparatus thereof.

FIELD OF THE INVENTION

It has heretofore been known to conduct the machining and processing of work products, for example, can ends in the following manner.

Can ends are first of all formed by press-cutting a plate material such as an aluminum plate or tinplate in the form of a can end having a portion to be curled, and the like by a shell press machine (this process will hereinafter be called "machine processing"). The shell press machine serves to continuously form the can ends at the same time in its plural stations and to continuously discharge them from the individual stations. Specifically, the shell press machine forms a total of 1200 can ends per minute in four stations by way of example, said stations each having an outlet from which the can ends are discharged continuously at a rate of 300 can ends per minute.

In order to keep the airtightness of a seamed portion of a can end to a can, the can ends thus formed are then subjected to a coating process in which a sealing compound is coated on the inner surfaces of their seaming panels and portions to be curled by a lining machine (this process will hereinafter be called "coat processing"). The lining machine is adapted to continuously receive the can ends fed at a single position, coat them and continuously discharge the thus-coated can ends through another single position. Specifically, the lining machine continuously coats the can ends fed through one inlet, for example, at a rate of 1200 can ends per minute and continuously discharges them through one outlet.

In order to make easily openable can ends, the can ends thus coated are then subjecting to a machining in which a score to facilitate opening is made on their panel portions and a tab is fitted thereto by a conversion press machine (this process will hereinafter be called "EO machining"). The conversion press machine is adapted to continuously receive the can ends fed at the same time at a plurality of positions, continuously EO-treat a plurality of the can ends at the same time and continuously discharge the thus-treated can ends through a plurality of other positions. Specifically, the conversion press machine is equipped with, for example, two inlets and receives 600 can ends per minute through each inlet. The can ends fed through the two inlets are continuously mechanically treated in their corresponding two stations of the conversion press machine, which are each equipped with an outlet. The thus-treated can ends are continuously discharged through the outlets.

Thereafter, the can ends thus treated are subjected to an airtight test for determining whether pin holes and the like are bored in the scores and the portion fitted with the tabs, by an air leakage tester.

As described above, the shell press machine is equipped with four outlets. However, the lining machine has only one inlet. As a result, when the shell press machine is connected to the lining machine on the same line, four lining machines are required correspondingly to the four outlets of the shell press machine. In addition, the conversion press machine is equipped with two inlets. Accordingly, when the lining machines are connected to the conversion press machine on the same line, two conversion press machines are required correspondingly to the respective outlets of the four lining machines. When the machining and processing line for can ends is constructed in the above described manner, one shell press machine requires on the same line four lining machines and two conversion press machines. There is therefore a disadvantage that a wide place is required for the machining and processing line.

The delivery of the shell press machine is 300 can ends per minute for each outlet. When the lining machines each having a throughput of 1200 can ends per minutes are connected to the respective outlets, there is also the disadvantage that the delivery of the shell press machine affects the capacity of the lining machines, resulting in a lowering of processing efficiency.

Accordingly, it is considered that can ends discharged through the respective outlets of the shell press machine are fed to the lining machine by guiding them through a single guide chute which has been formed by joining guide chutes extending respectively to the outlets between the shell press machine and the lining machine. In addition, it is considered that can ends discharged through the outlet of the lining machine are fed to the conversion press machine in two portions by causing a guide chute extending to a single outlet of the lining machine to branch into two guide chutes and respectively connecting the thus-branched chutes to two inlets of the conversion press machine between the lining machine and the conversion press machine. When a machining and processing line for can ends is constructed in the above-described manner, one shell press machine requires only one lining machine and one conversion press machine on the same line. Therefore, the place for locating the line can be reduced and moreover, the throughput capacity of the lining machine can be utilized sufficiently, resulting in an improvement in processing efficiency.

Since the can ends are however wrought by the respective working machines at a speed as high as 1200 can ends per minute, they move on the respective guide chutes at a high speed. Therefore, when they are joined or divided by the guide chutes, there is a potential problem that the can end guided by the guide chutes or the guide chute collide with each other at their joining or division points, whereby they are damaged.

In addition, there is also a potential problem that if the can ends are wrought at a high speed as described above, the whole working line is stopped when any one of the working machines is stopped, resulting in a lowering of working efficiency. Therefore, it is considered that storage sites for temporarily storing a plurality of can ends are provided between adjacent working machines to take the can ends in and out of its corresponding storage site in answer to the stop of each working machine. Since the can ends are taken in and out of such storage sites by the guide chutes at their parts, there is however a disadvantage that the device becomes complicated.

SUMMARY OF THE INVENTION

In order to solve such disadvantages, the present invention has as its object the provision of a method of feeding work products, by which the place for locating a working apparatus can be reduced and working efficiency can be improved, and an apparatus thereof.

In order to achieve such an object, in the first aspect of the method according to this invention, there is provided a method of feeding work products between first and second processes, said first process comprising continuously mechanically treating the work products at the same time by the first machine and then continuously discharging the thus treated work products from a plurality of discharging parts, and said second process comprising receiving the work products fed from the plural discharging parts of the first machine in the first process to feeding part(s) of the second machine, which is smaller in number than those of the first machine to further mechanically treat the work products by the second machine, which comprises the steps of:

feeding the work products discharged from the plural discharging parts in the first process along respective feeding paths;

quickly feeding the predetermined numbers of work products, among those continuously conveyed along the feeding paths, in their travelling directions, respectively, to stop the thus divided work groups in respective stay parts, which are connected to the feeding paths, in an arranged state; and selectively holding one of the plural work groups stopped and arranged at the respective stay parts by a robot system to successively feed the work groups to the feeding part(s) in the second process.

In the first aspect of the apparatus according to the present invention, there is also provided an apparatus for feeding work products, which is provided between first and second machines, said first machine being adapted to continuously mechanically treat a plurality of work products at the same time and continuously discharge the thus-treated work products from a plurality of outlet positions, and said second machine being adapted to receive the work products fed from the plural discharging parts of the first machine to feeding part(s) of the second machine, which is smaller in number than those of the first machine, to further mechanically treat the work products, which comprises:

feeding paths for respectively conveying the work products discharged from the plural discharging parts of the first machine;

quick-feeding means for work products, by which the predetermined numbers of work products, among those continuously conveyed along the feeding paths, are quickly fed in their travelling directions, respectively, to divide the work products into respective work groups;

stay parts for stopping the divided and arranged work groups; and a robot system for selectively holding one of the plural work groups stopped and arranged at the respective stay parts to successively feed the work groups to the feeding part(s) in the second process.

In the second aspect of the method according to this invention, there is further provided a method of feeding work products between first and second processes, said first process comprising continuously mechanically treating work products by the first machine and then continuously discharging the thus-treated work products from discharging part(s), and said second process comprising receiving the work products fed from the discharging part(s) of the first machine in the first process to feeding parts of the second machine, which are greater in number than that of the first machine, to further mechanically treat the work products by the second machine, which comprises the steps of:

feeding the work products to be discharged to the discharging part(s) in the first process;

quickly feeding the predetermined number of work products, among those continuously conveyed, in their travelling direction to stop the thus-divided work group in a stay part in an arranged state; and holding the work group arranged in the stay part by a robot system to selectively and successively feed the work group to the feeding parts in the second process.

In the second aspect of the apparatus according to the present invention, there is still further provided an apparatus for feeding work products, which is provided between first and second machines, said first machine being adapted to continuously mechanically treat work products and continuously discharge the thus-treated work products, and said second machine being adapted to receive the work products fed from discharging part(s) of the first machine to feeding parts of the second machine, which are greater in number than that of the first machine, to further mechanically treat the work products, which comprises:

feeding path(s) for conveying the work products to be discharged to the discharging part(s) of the first machine;

quick-feeding means for work products, by which the predetermined number of work products, among those continuously conveyed along the feeding path(s), are quickly fed in their travelling direction to divide the work products into work groups;

stay part(s) for stopping the divided and arranged work groups; and a robot system for holding one of the work groups stopped and arranged at the stay part(s) to selectively and successively feed the work groups to the feeding parts in the second process.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

BRIEF DESCRIPTION OF THE DRAWINGS

FIGS. 7 and 8 are respectively cross-sectional views taken along the lines VII—VII and VIII—VIII of FIG. 3.

DETAILED DESCRIPTION OF THE INVENTION AND PREFERRED EMBODIMENTS

One embodiment of the present invention will hereinafter be described with reference to the accompanying drawings.

In this embodiment, can ends are provided as work products, and a method of feeding the can ends and an apparatus thereof will be described on the basis of a working line for can ends.

Figure 1:
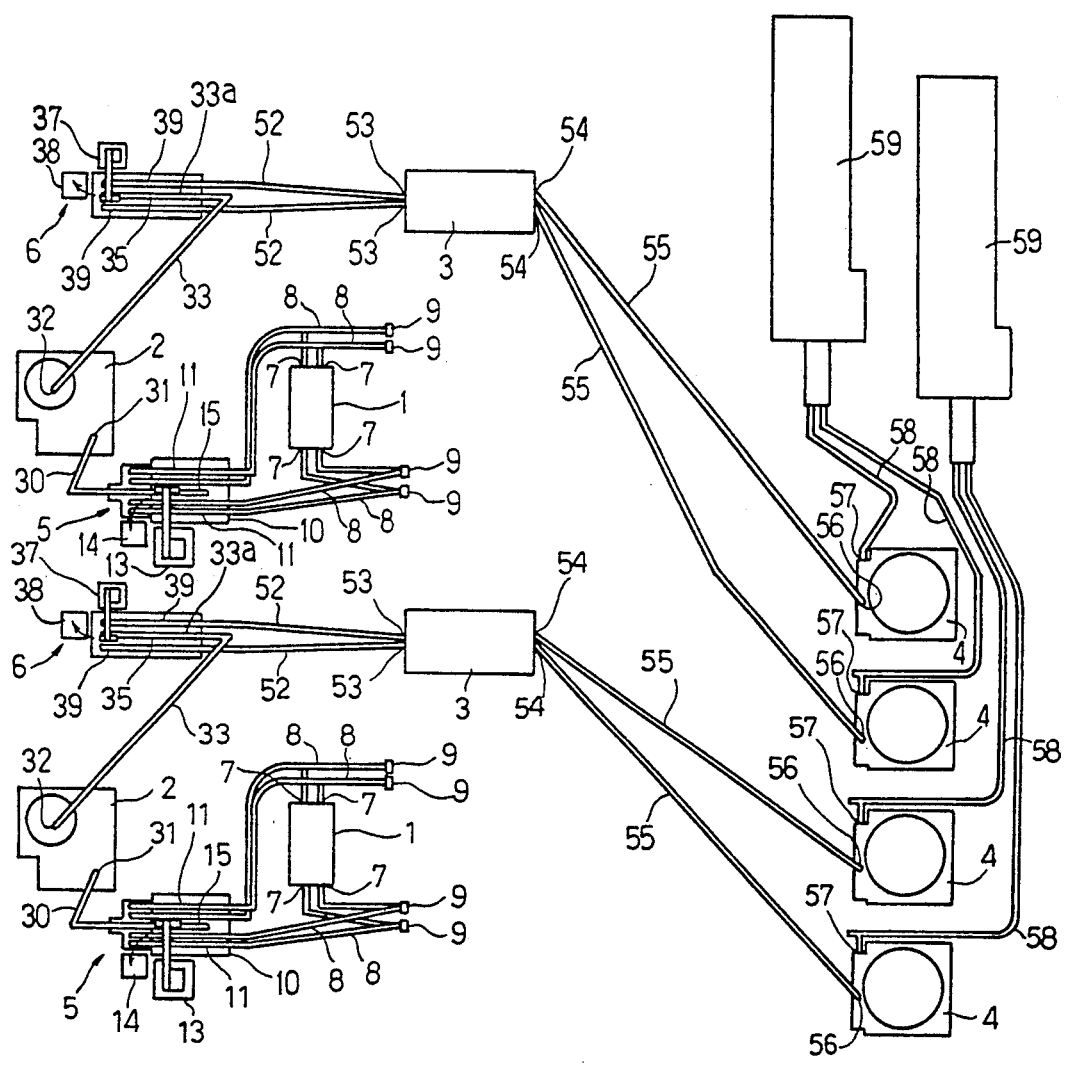
FIG. 1 is a schematic illustration showing the whole working line for can ends, including an apparatus according to the present invention.

In FIG. 1, the working line comprises a shell press machine 1 for conducting a machine processing in which a plate material such as an aluminum plate or tinplate is press-cut into can ends having a portion to be curled and the like around a panel portion, a lining machine 2 for performing a coat processing wherein the inner surfaces of seaming panels and portions to be curled of the can ends are coated with a sealing compound after the machine processing by the shell press machine 1, a conversion press machine 3 for carrying out an EO machining wherein a score to facilitate opening and a tab are provided on the can ends to form easily openable can ends after the coat processing by the lining machine 2, and air leakage testers 4 for conducting an airtight test for determining whether pin holes and the like are bored in the score to facilitate opening and the portion fitted with the tab after the EO machining by the conversion press machine 3. The working line also includes the first transfer mechanism 5 for the can ends, which is provided between the shell press machine 1 and the lining machine 2 and the second transfer mechanism 6 for the can ends, which is disposed between the lining machine 2 and the conversion press machine 3.

The above-mentioned parts will hereinafter be described in detail.

The shell press machine 1 forms a total of 1200 can ends per minute in four stations, said stations each having an outlet 7 from which can ends are discharged continuously at a rate of 300 can ends per minute.

Figure 2:
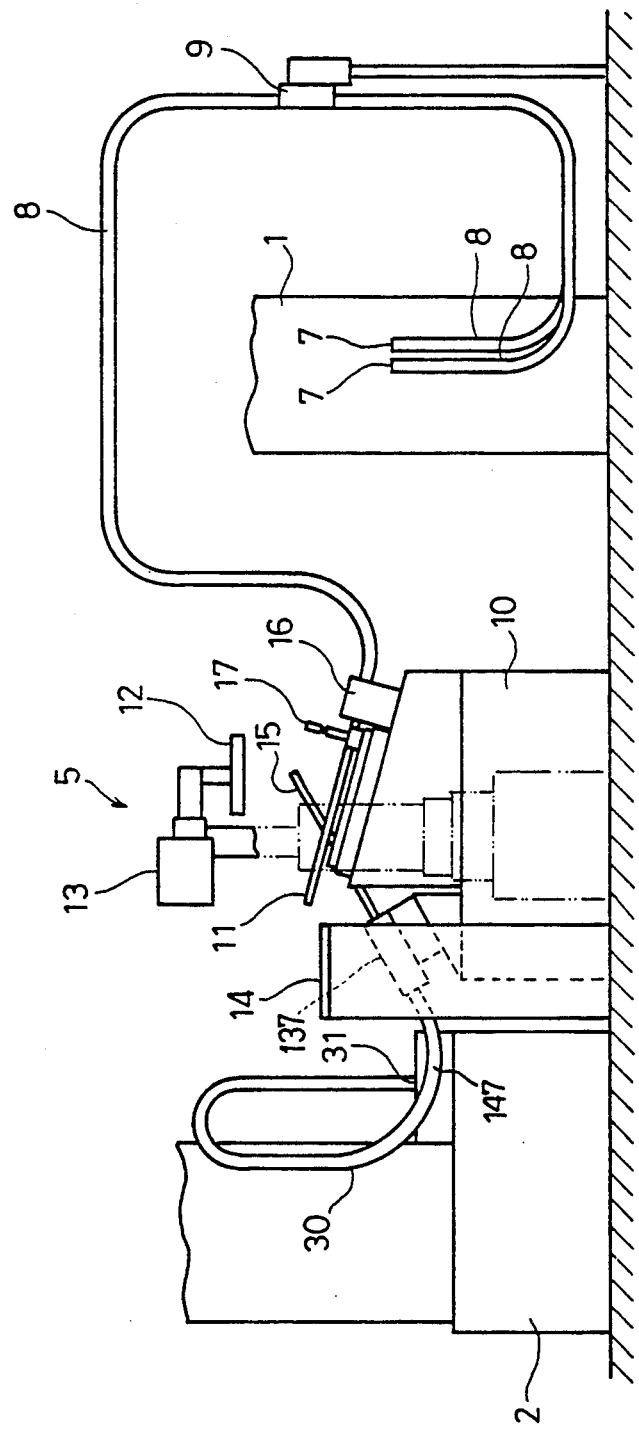
FIG. 2 is an explanatory side elevation illustrating a part of an apparatus according to one embodiment of the present invention.

As illustrated in FIGS. 1 and 2, first guide chutes 8 extend to the outlets 7 of the shell press machine 1, respectively. The terminal of each first guide chute 8 is connected to the first transfer mechanism 5. The first guide chute 8 is equipped with a feeding device 9 for forcedly conveying the can ends which travel through its interior.

As illustrated in FIG. 2, the first transfer mechanism 5 is provided on a base 10. The transfer mechanism 5 includes stay parts 11, a robot system 13, a storage site 14 and a transfer part 15.

In each stay part 11, the predetermined number of can ends are divided from the can ends continuously fed through each first guide chute 8 to arrange and stop them therein. The robot system 13 is provided adjacently to the base 10 and holds a can end group X, which has been arranged and stopped at the stay part 11, by its grip means 12 to transfer it. The storage site 14 is provided adjacently to the robot system 13 and base 10 and serves to store can end groups X in an arranged state. The transfer part 15 is provided on the base 10, and the can end group X held by the grip means 12 of the robot system 13 is transferred thereon.

Figure 3:
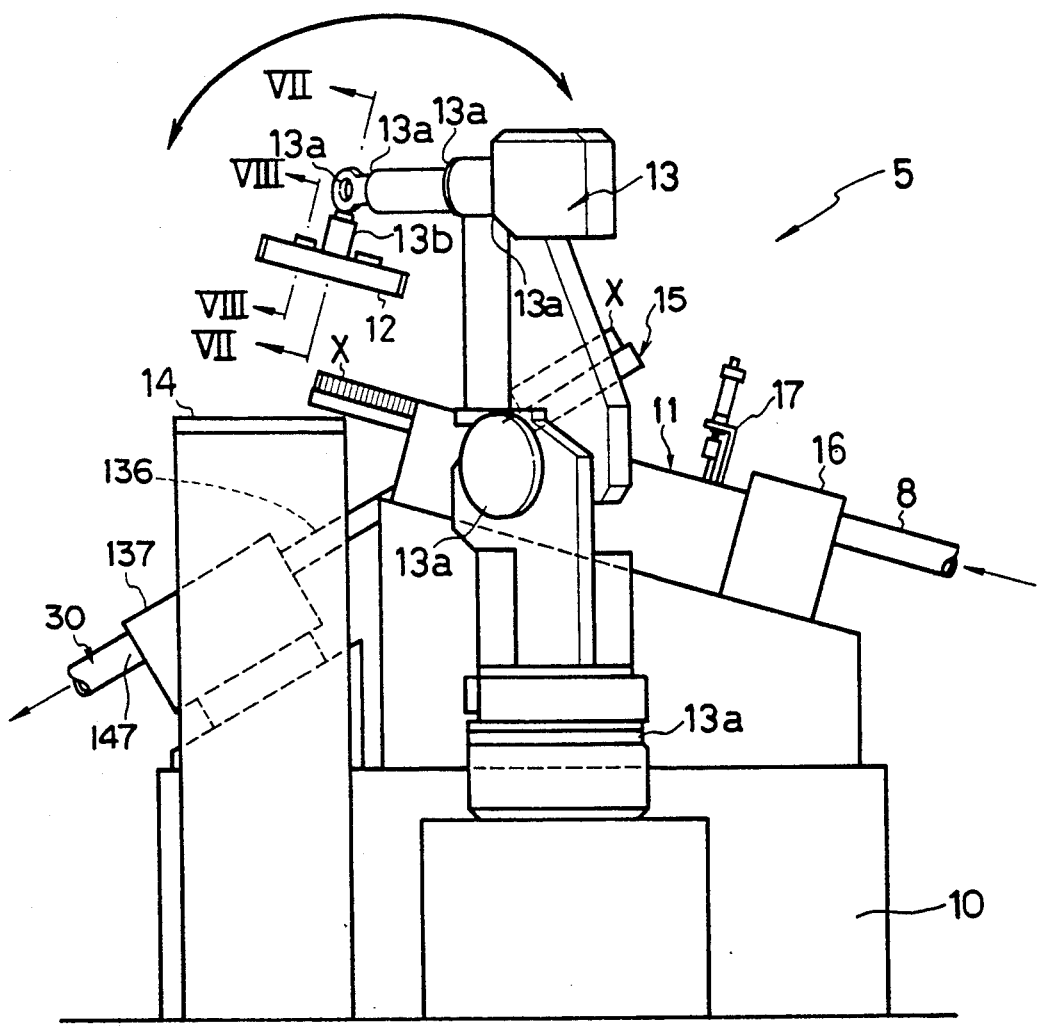
FIG. 3 is a schematically explanatory illustration of a transfer mechanism used in the present invention.
Figure 4:
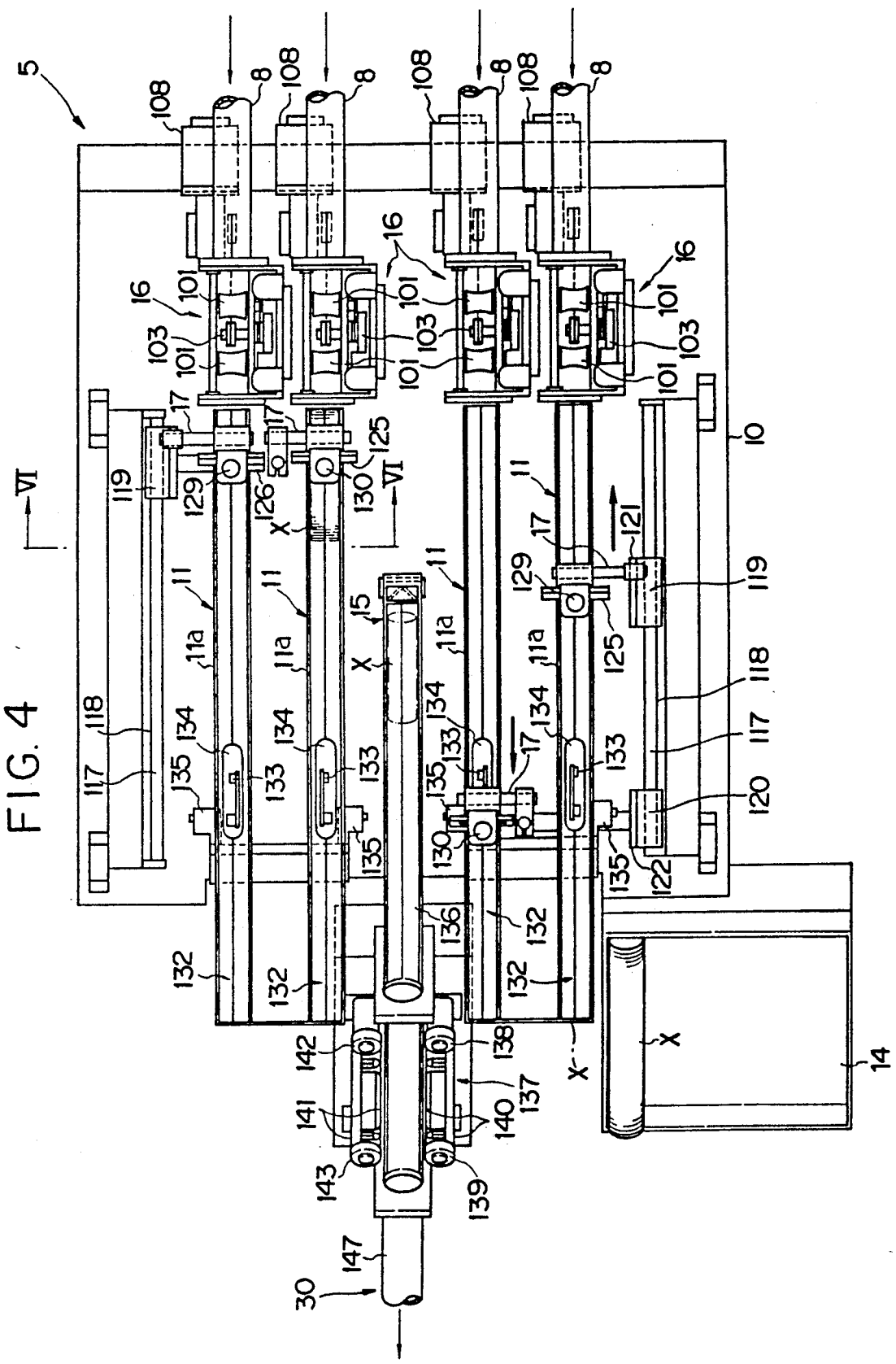
FIG. 4 is a plan view illustrating a principal part of the transfer mechanism of FIG. 3.
Figure 5:
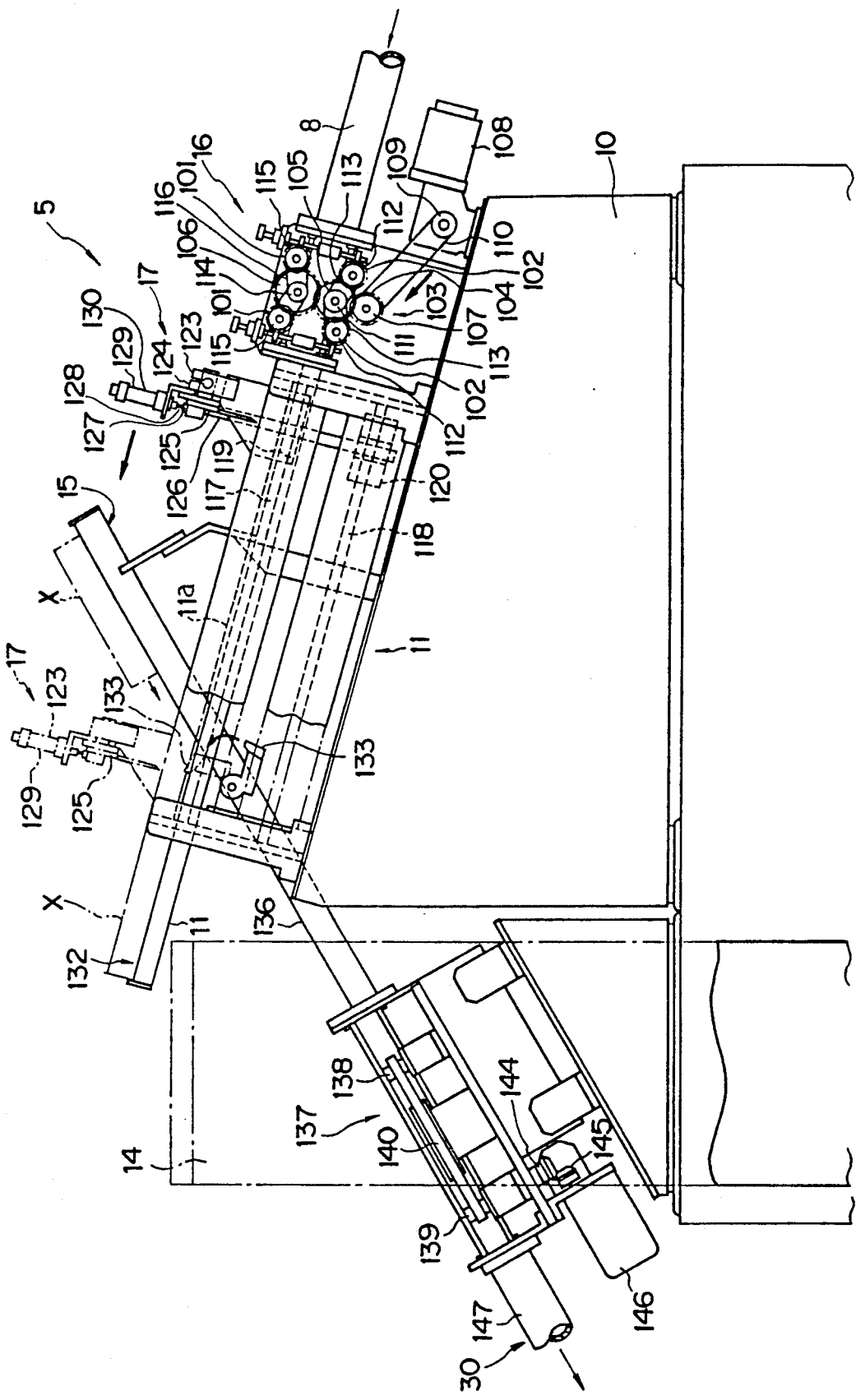
FIG. 5 is an explanatory side elevation of the principal part of FIG. 4.

The first transfer mechanism 5 is illustrated in more detail in FIGS. 3 through 5.

The stay parts 11 are in four rows corresponding to the number of the first guide chutes 8 and are each provided with a gradually ascending inclined part 11a. The stay parts 11 respectively include first feeding devices 16 for feeding the can ends along the inclined parts 11a and quick-feeding devices 17 for dividing the can ends conveyed by the first feeding devices 16 into groups X of the predetermined number of the can ends and quickly feeding them.

As shown in FIGS. 4 and 5, each of the first feeding devices 16 is equipped with can end feeding rollers 101 and 102, which are positioned on the upper and lower sides, respectively, and counterrotate, and a drive unit 103 for rotating the can end feeding rollers 101, 102. The can end feeding rollers 101, 102 are disposed at a distance that they can mutually hold a can end. The drive unit 103 comprises the first gear 104, the second gear 105 and the third gear 106, which rotate in mesh with each other. They are rotated by stretching an endless belt 110 between a pulley 107 attached to the first gear 104 and a pulley 109 attached to a drive motor 108. To the second gear 105, are connected the can end feeding roller 102 positioned downward, by an endless belt 113 which has been stretched between pulleys 111, 112 respectively attached to the second gear 105 and the second rollers 102. To the third gear 106, are connected the can end feeding roller 101 positioned upward, by an endless belt 116 which has been stretched between pulleys 114, 115 respectively attached to the third gear 106 and the first rollers 101. By driving the first gear 104 by the drive motor 108, the second gear 105 and the third gear 106 are rotated and moreover, the can end feeding rollers 101, 102 are rotated.

By means of the first feeding devices 16 made up as described above, the can ends are smoothly fed from the first guide chutes to the stay parts 11. In addition, the can end groups X can be fed along the first gradually ascending inclined parts 11a of the stay parts 11 by the first feeding devices 16.

Figure 6:
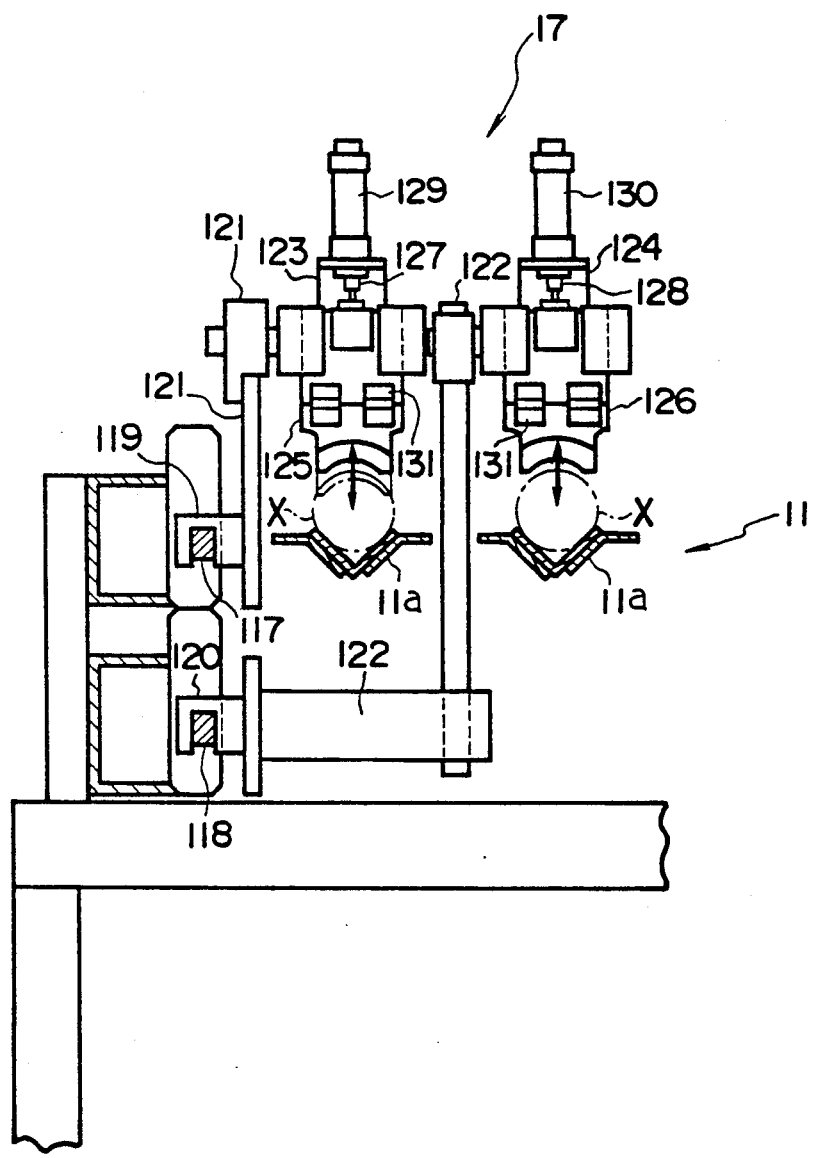
FIG. 6 is a cross-sectional view taken along the line VI—VI of FIG. 4.

As illustrated in FIGS. 3 through 6, the quick-feeding devices 17 are made up of two pairs of rails 117 and 118 disposed on the upper and lower sides along the outsides of both outer stay parts 11, guide members 119 and 120 guided by the rails 117, 118, respectively, and sliding therealong, supports 123 and 124 connected to the guide members 119, 120, respectively, through their corresponding connecting members 121 and 122, cutter members 125 and 126 vertically movably supported on the supports 123, 124, respectively, cylinders 129 and 130 for respectively expanding and contracting piston rods 127 and 128, to the tips of which the cutter members 125, 126 are attached respectively, and counters which count the number of can ends passing through right under the cutter members 125, 126 and are not illustrated. The rails 117 positioned on the upper side serve to move the cutter members 125 along the first inclined parts 11a positioned on the outer sides. The rails 118 positioned on the lower side serve to move the cutter members 126 along the first inclined parts 11a positioned on the inner sides. As shown in FIG. 6, the cutter members 125, 126 of the quick-feeding devices 17 are each equipped with hinges 131 in their center portions, so that the tip part of the cutter member 125, 126 is swingable only in a forward direction. Since the tip part of the cutter member 125 or 126 swings only in the forward direction, when the cutter member 125 or 126 is moved rearward along the first inclined part 11a in the state that it has moved down, the cutter member 125 or 126 can be smoothly moved to a position where a can end group X is divided even when can end group X fed by the first feeding device 16 has been stockpiled in the first inclined part 11a. As shown in FIG. 6, the tip part of the cutter member 125 or 126 is shaped in the form of a substantial arc and engages with the periphery of the can end.

By means of the quick-feeding device 17, the number of the can ends continuously fed from the first feeding device 16 can be counted by the counter to divide them into groups X of the predetermined number of the can ends and to quickly feed them. The can end group X which has been divided by the quick-feeding device 17 and engaged at its rear end is quickly fed along the first inclined part 11a in its ascending direction by a drive unit (not illustrated) of the quick-feeding device 17. The can ends of the group X become arranged by their own weights at a stay position 132 ranging to the first inclined part 11a and are to be transferred. At the stay position 132, a press member 133 which presses the rear end of the can end group X to form a part of a holding means for holding the can end group X in the state that the can ends have been stacked is pivotally provided. The press member 133 is made up in such a manner that it passes through a through-hole defined in the first inclined part 11a and projects above the upper surface of the inclined part 11a. This projecting movement is performed by a high speed motor 135.

The high speed motor 135 is actuated after the can end group X passes above the press member 133, so that the press member 133 presses a substantially central portion of the can end group X from its rear side to stop it there. At this time, since the tip part of the cutter member 125, 126 is shaped in the form of the substantial arc as described above, the press member 133 can stop the can end group X without interfering with the tip part of the cutter member 125, 126.

Thus, the can end group X is stopped in an arranged state at the front side of the stay part 11.

As illustrated in FIGS. 3 through 5, the transfer part 15 has the second inclined part 136, which is alone and gradually descending. The second feeding device 137, which is a transfer means for transferring can ends, is provided on the terminal portion of the second inclined part 136.

As shown in FIGS. 4 and 5, the second feeding device 137 comprises two pairs of rotating pulleys 138, 139 and 142, 143, an endless belt 140 angularly movably stretched between the pulleys 138, 139, and an endless belt 141 opposite to the belt 140 and also stretched between the pair of pulleys 142, 143. The endless belts 140, 141 are disposed at a distance that they can mutually hold the can end. By respectively rotating the pulleys 138, 139 and 142, 143 in delivery directions of the can ends by means of a drive unit 146 connected to the pulleys 139 and 143 through bevel gears 144 and 145, respectively, both endless belts 140, 141 are moved angularly in delivery directions of the can end group X, respectively.

As illustrated in FIG. 3, the robot system 13 is a 6-axis articulated industrial robot system and has an arm 13b at its distal end through joints 13a. The movement of the arm 13b is controlled by a robot control means such as a computer though it is not particularly illustrated.

The grip means 12 is attached to the tip of the arm 13b. As shown in FIGS. 7 and 8, the grip means 12 includes a pair of gripping members 12b, which are swingably and pivotally attached to a frame 12a and are in the form of an arc in section, and an air cylinder 12c for swinging both gripping members 12b in directions separating from each other. On both ends of both gripping members 12b, interlocking parts 12d for interlocking the can end group X from its front and rear directions when the can end group X is held are formed.

The robot system 13 serves to selectively hold one of the can end groups X stopped at the stay parts 11 in four rows by the grip means 12 to transfer it to the sole transfer part 15.

Thus, the robot system 13 can hold the can end group X arranged and stopped at the stay part 11 by its grip means 12 to transfer it to the transfer part 15. At this time, the robot system 13 selectively hold one of the can end groups X stopped at the stay parts 11 in four rows by the grip means 12.

The transfer part 15 is connected to the proximal end 147 of the second guide chute 30 which is a single chute and which is connected at its terminal portion to the lining machine 2 via the second feeding device 137. Thus, the can ends are fed to the lining machine 2 through the second guide chute 30.

As illustrated in FIG. 1, the lining machine 2 is equipped with one inlet 31 from which the can ends are fed, and one outlet 32 from which the can ends are discharged. The lining machine 2 continuously processes the can ends fed through the sole inlet 31 at a rate of 1200 can ends per minute and continuously discharges them from the sole outlet 32.

The third guide chute 33 extends to the outlet 32 of the lining machine 2 and is connected at its terminal portion to the second transfer mechanism 6.

Figure 9:
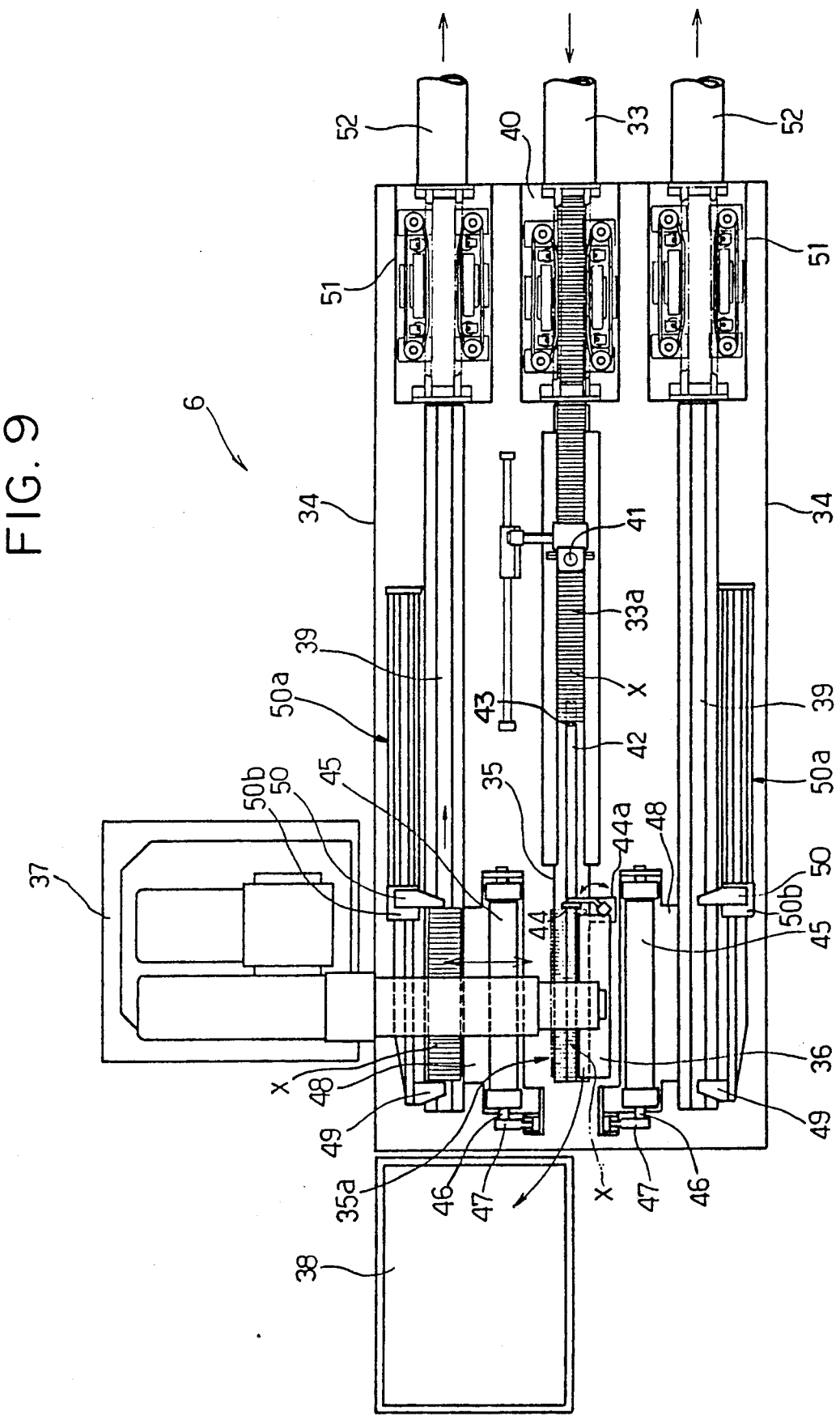
FIG. 9 is an explanatory plan view illustrating a part of an apparatus according to the embodiment of this invention.

As shown in FIGS. 1 and 9, the second transfer mechanism 6 is disposed on the base 34. The transfer mechanism 6 comprises an inlet passage 33a, a stay part 35, a robot system 37, a storage site 38, transfer parts 39 and carrying parts 45. The inlet passage 33a is disposed on the base. A plurality of can ends are introduced to the inlet passage 33a in an arranged state through the third guide chute 33. In the stay part 35, the predetermined number of can ends, among those fed through the third guide chute 33, are quickly fed to arrange and stop them therein. The robot system 37 is provided adjacently to the base 34 and holds a can end group X, which has been arranged and stopped at the stay part 35, by a grip means 36 to transfer it. The storage site 38 is provided adjacently to the robot system 37 and base 34 and serves to store a plurality of can end groups X in an arranged state. The transfer parts 39 are provided on the base 34, and the can end group X held by the grip means 36 of the robot system 37 is selectively transferred on any one of two transfer parts 39 through the respective carrying parts 45. The transfer parts 39 are disposed below the stay part 35 and carrying part 45 with a difference in level.

As illustrated in FIG. 9, the stay part 35 is provided with connection to the third guide chute 33 and equipped with a feeding device 40 for feeding the can ends to the stay part 35 and a quick-feeding device 41 for dividing the can ends conveyed by the feeding device 40 into groups X of the predetermined number of the can ends to quickly feed them. Both feeding device 40 and quick-feeding device 41 have the same constructions as those of the above-described feeding device 137 and quick-feeding device 17. Therefore, their descriptions will be omitted. The can end group X, which has been divided by the quick-feeding device 41, is conveyed further by the quick-feeding device 41. Thereafter, it is engaged, at its rear end, with a claw 43, which is moved along a guide groove 42 by a drive means not illustrated, and then transferred in an arranged state to a stay position 35a situated at the distal end of the stay part 35. The claw 43 is made up so as to freely project above the upper surface of the stay part 35. At the stay position 35a, a press member 44 for pressing the rear end of the can end group X to keep the can ends in a stacked state is provided pivotably by a high speed motor 135.

The transfer parts 39 are each equipped with a carrying part 45, on which the can end group X stopped at the stay part 35 is temporarily placed, at the same level as the stay part 35. The carrying part 45 is pivoted at both ends in the lengthwise direction and is swingable toward the transfer part 39 when the can end group X is placed thereon. The carrying part 45 is swung toward the transfer part 39 by a cylinder 47 coupled to a pivot 46 at one end. The carrying part 45 and transfer part 39 are connected to each other through a guide plate 48. The guide plate 48 has an inclined part descending toward the transfer part 39. By the swinging movement of the carrying part 45, the can end group X is transferred to the transfer part 39 while rolling in its circumferential direction.

As shown in FIG. 9, the transfer parts 39 are each provided with the first interlocking piece 49 for interlocking one end surface of the can end group X, which has been transferred to the proximal portion of the transfer part 39 along the guide plate 48, and the second interlocking piece 50 for interlocking the other end surface of the can end group X. When the first and second interlocking pieces 49 and 50 mutually hold the can end group X, they are moved by a rodless cylinder 50a along the transfer part 39 in the delivery direction of the can end group X, i.e., in the right direction in FIG. 9. The second interlocking piece 50 is provided so as to be upward swingable by a cylinder 50b. By upward swinging the second interlocking piece 50, the can end group X is released from its mutual holding by the first and second interlocking pieces 49, 50. A can end feeding device 51 is provided at the terminal portion of each transfer part 39. The feeding device 51 has the same construction as that of the above-described feeding device 137. Therefore, its description will be omitted.

The robot system 37 holds the can end group X arranged and stopped at the stay part 35 by its grip means 36 to transfer it to the carrying part 45 of the transfer part 39. At this time, the robot system 37 holds the can end groups X stopped at the sole stay part 35 by the grip means 36 to selectively and successively transfer it to the two transfer parts 45.

By interposing the carrying part 45 in the transfer part 39, the operating range of the arm of the robot system 37 can be made small. Therefore, the robot system 37 can be allowed to follow the high-speed conveyance of the can ends with ease.

Fourth guide chutes 52 respectively extend from the two transfer parts 39 through the feeding devices 51.

As illustrated in FIG. 1, the fourth guide chutes 52 are connected to the conversion press machine 3.

The conversion press machine 3 is equipped with two inlets 53 and two outlets 54. The can ends are fed through each of the inlets 53 at a rate of 600 can ends per minute. The can ends are subjected to an EO machining in which a score to facilitate opening and a tab are provided on each can end. The can end thus machined are continuously discharged from the outlets 54.

Fifth guide chutes 55 respectively extend from the outlets 54 of the conversion press machine 3, and connected at their terminals to inlets 56 of the air leakage testers 4. The sixth guide chutes 58 respectively extend from outlets 57 of the air leakage testers 4, and connected at their terminals to a delivery section 59 from which the can ends subjected to the individual machining and processing are delivered.

Operation of the apparatus arranged as described above and according to this embodiment will hereinafter be described.

A plate material is first of all press-cut by the shell press machine 1 to form a plurality of can ends having a portion to be curled and the like. The can ends are then discharged from the outlets 7 and fed to the first transfer mechanism 5 through the first guide chutes 8. The can ends passing through the first guide chutes 8 are continuously fed to the first transfer mechanism 5 without a hitch by the feeding devices 9 provided in the first guide chutes 8. The can ends are then fed to the four stay parts 11 in the first transfer mechanism 5, which have been respectively connected to the first guide chutes 8. The can end fed to the stay parts 8 are forcedly and continuously conveyed in the ascending direction along the inclined parts 11a of the stay parts 11 by the can end feeding devices 16 provided at the proximal portions of the stay parts 11. Thereafter, the can ends conveyed along the inclined parts 11a of the stay parts 11 are divided into groups of the predetermined number of can ends and quickly fed by the quick-feeding devices 17 to stop at the stay positions 132 of the stay parts 11 as can end groups X in an arranged state.

The can end groups X stopped at the four stay parts 11 in the arranged state are selectively held by the grip means 12 of the robot system 13 and successively transferred to the sole transfer part 15. The can end group X transferred to the transfer part 15 moves down by its own weight along the descending inclined part of the transfer part 15 and delivered to the second guide chute 30 by the feeding device 137 provided at the terminal portion of the transfer part 15. Therefore, the can ends fed to the first transfer mechanism 5 through the four outlets 7 of the shell press machine 1 can be fed to the sole inlet 31 of the lining machine 2 through the second guide chute 30 by the first transfer mechanism 2. Accordingly, one shell press machine 1 requires only one lining machine. In addition, the can ends discharged from the four outlets 7 each at a rate of 300 can ends per minute can be fed to the lining machine 2 at a rate of 1200 can ends per minute by collecting them at one place. It is therefore possible to improve processing efficiency compared with the conventional apparatus.

When the lining machine 2 has been stopped by way of example, the feeding of the can ends to the lining machine 2 is stopped. In this case, the can end groups X present in the stay parts 11 of the first transfer mechanism 5 are successively transferred to the storage site 14 by holding them with the grip means 12 of the robot system 13. Therefore, can ends can be fed to the first transfer mechanism 5 without stopping discharging the can ends from the shell press machine 1, so that the machine processing by the shell press machine 1 can be continuously carried out. Accordingly, the machine processing by the shell press machine 1 can be continued without being affected by the stop of the lining machine 2. It is hence possible to prevent the machining efficiency from lowering.

When the shell press machine 1 has been stopped by way of example, the discharging of the can ends from the shell press machine 1 is stopped. In this case, the can end groups X arranged and stored in the storage site 14 are successively transferred to the transfer part 15 of the first transfer mechanism 5 by holding them with the grip means 12 of the robot system 13. Therefore, can ends can be smoothly fed to the lining machine 2 by the first transfer device 5, so that the coat processing by the lining machine 2 can be continuously carried out. Accordingly, the coat processing by the lining machine 2 can be continued without being affected by the stop of the shell press machine 1. It is hence possible to prevent the processing efficiency from lowering.

In the first transfer mechanism 5, as described above, the robot system 13 serves to transfer the can end groups X from stay parts 11 to the transfer part 15 and the storage site 14, and from the storage site 14 to the transfer part 15. It is hence possible to rapidly carry out the transference of the can end groups X with a simple structure.

The inner surfaces of seaming panels and portions to be curled of the can ends are then coated with a sealing compound by the lining machine 2. The thus-coated can ends are then discharged continuously from the outlet 32, and fed to the second transfer mechanism 6 through the third guide chute 33. The can ends are fed to the sole stay part 35 of the second transfer mechanism 6, which has been connected to the third guide chute 33. The can ends fed to the stay part 35 are forcedly and continuously conveyed along the stay part 35 by the can end feeding device 40 provided at the proximal portion thereof. Thereafter, the can ends fed along the stay part 35 are divided into groups of the predetermined number of can ends and quickly fed by the quick-feeding device 41. The can end group X in an arranged state is then engaged, at its rear end, with a claw 43, and then moved to the distal portion of the stay part 35. The claw 43 is then disengaged from the can end group X, and at the same time the press member 44 is pivotally moved to press the rear end of the can end group X, so that it is possible to prevent the can end group X stopped at the stay part 35 from slipping from its rear end and to stop it in an arranged state.

The can end group X stopped in the arranged state at the distal portion of the sole stay part 35 is held by the grip means 36 of the robot system 37 to selectively and successively transfer it to the two carrying parts 45. The carrying parts 45 are pivotally swung toward the respective transfer parts 39 when the can end group X is transferred. Therefore, the can end group X transferred to the carrying part 45 rolls by its own weight in the descending direction along the inclined part of the descending guide plate 48 provided between the carrying part 45 and the transfer part 39 to move to the transfer part 39, and is interlocked by the first and second interlocking pieces 49 and 50 of the transfer part 39 from both end sides thereof. The can end group X interlocked by the first and second interlocking pieces 49, 50 is then moved to the terminal portion of the transfer part 39 by moving the first and second interlocking pieces 49, 50 in the delivery direction of the can ends. The can end group X is then released from the engagement with the second interlocking piece 50 at the terminal portion of the transfer part 39, and delivered to each fourth guide chute 52 by the feeding device 51. Therefore, the can ends fed from the sole outlet 32 of the lining machine 2 to the second transfer device 6 can be separately fed to the two inlets of the conversion press machine 3 through the fourth guide chutes 52.

When the conversion press machine 3 has been stopped by way of example, the feeding of the can ends to the conversion press machine 3 is stopped. In this case, the can end groups X present in the stay part 35 of the second transfer mechanism 6 are transferred to the storage site 38 by holding them with the grip means 36 of the robot system 37. Therefore, can ends can be fed to the second transfer mechanism 6 without stopping discharge of the can ends from the lining machine 21, so that the coat processing by the lining machine 2 can be continuously carried out. Accordingly, the coat processing by the lining machine 2 can be continued without being affected by the stop of the conversion press machine 3. It is hence possible to prevent the processing efficiency from lowering.

When the lining machine 2 has been stopped by way of example, the discharging of the can ends from the lining machine 2 is stopped. In this case, the can end groups X arranged and stored in the storage site 38 are successively transferred to the transfer part 45 of the second transfer mechanism 6 by holding them with the grip means 36 of the robot system 37. Therefore, can ends can be smoothly fed to the conversion press machine 3 by the second transfer device 6, so that the EO machining by the conversion press machine 3 can be continuously carried out. Accordingly, the EO machining by the conversion press machine 3 can be continued without being affected by the stop of the lining machine 2. It is hence possible to prevent the machining efficiency from lowering.

In the second transfer mechanism 6, as described above, the robot system 37 serves to transfer the can end groups X from stay part 35 to the carrying part 45 of the transfer part 39 and the storage site 38, and from the storage site 38 to the carrying part 45 of the transfer part 39. It is hence possible to rapidly carry out the transference of the can end groups X with a simple structure.

The can ends are then provided with a score to facilitate opening and a tab by the conversion press machine 3. The can end thus machined are subjected to an airtight test for determining whether pin holes and the like are bored in the score to facilitate opening and the portion fitted with the tab or not by the air leakage testers 4. Thereafter, the thus-tested can ends are delivered out of the delivery section 59.

Although the description has been made with reference to the production line for can ends in the preferred embodiment, it goes without saying that the present invention is not limited thereto. Although this embodiment has illustrated the feeding of the work products machined or processed by the first machine from four positions of the first machine to one position of the second machine, and the feeding of the work products machined or processed by the first machine from one position of the first machine to two positions of the second machine, it will be obvious that this invention is not limited thereto.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of feeding work products between first and second processes, said first process comprising simultaneously, continuously, mechanically treating the work products by at least one first machine and then continuously discharging the work products from a plurality of discharging parts, and said second process comprising receiving the work products fed from the plural discharging parts of the first machine in the first process to at least one feeding part of a second machine, the number of the feeding parts of the second machine being fewer than the number of discharging parts of the at least one first machine, the second process further mechanically treating the work product by the second machine, the method comprising the steps of:

feeding the work products discharged from the plural discharging parts in the first process along respective feeding paths in a travelling direction;

quickly feeding a predetermined number of work products from the work products conveyed along the feeding paths in the travelling direction to form a work group;

stopping the work group formed by the step of quickly feeding in respective stay parts which are connected to the feeding paths, each of the work groups being held in an arranged state;

selectively holding one of the work groups stopped and arranged at the respective stay parts by a robot system; and successively feeding the work groups to the at least one feeding part of the second process via the robot system;

wherein each of the stay parts comprises an inclined passage gradually ascending toward a downstream side thereof, said step of quickly feeding comprising advancing said predetermined number of work products upwardly along said inclined passage, so that the predetermined number of the work products are arranged in a stacked state on said stay parts owing to the weight thereof and to the step of quickly feeding the work products.

2. The method as claimed in claim 1, further comprising the step of transferring when the second machine in the second process is stopped, one of the work groups arranged and stopped at the stay parts selectively held by the robot system, the work group being transferred to a storage site for storing work groups in an arranged state.

3. The method as claimed in claim 2, further comprising the step of successively feeding work groups from the storage site when the first machine in the first process is stopped, the work groups stored in the storage site being in the arranged state and being successively fed to the at least one feeding part of the second process.

4. The method as claimed in claim 1, wherein when the work products are can ends, the first process is a process comprising press-cutting a metal plate into can ends by the first machine, the first machine being a shell press machine having a plurality of outlets, and the second process is a process comprising coating inner surfaces of seaming panels and portions to be curled of the can ends with a sealing compound by the second machine, the second machine being a lining machine having a single inlet.

5. The method according to claim 1, wherein said first machine comprises an even number of discharging parts connected respectively to said feeding paths, said second machine comprises a single feeding part, and said feeding paths are disposed generally parallel to said single feeding part such that said feeding paths are disposed symmetrically on respective sides of said single feeding part.

6. An apparatus for feeding work products between a first machine and a second machine, said first machine simultaneously, continuously, mechanically treating a plurality of the work products and then continuously discharging the work products from a plurality of discharging parts, said second machine receiving the work products fed from the plurality of discharging parts of the first machine in the first process to at least one feeding part of the second machine, the number of the feeding parts of the second machine being fewer than the number of discharging parts of the first machine, the second machine further mechanically treating the work product, the apparatus comprising:

feeding paths for respectively conveying the work products from the plurality of discharging parts of the first machine in a travelling direction;

quick-feeding means for quickly feeding a predetermined number of work products conveyed along the feeding paths in the travelling direction to form a work group;

stay parts for stopping travel of the work groups, the stay parts being operatively connected to the feeding paths and arranging the work groups;

means for selectively holding one of the work groups stopped and arranged at one of the stay parts and for successively feeding the work groups to the at least one feeding part of the second machine, the means for selectively holding and successively feeding comprising a robot system;

each of the stay parts comprises an inclined passage gradually ascending toward a downstream side thereof, said quick feeding means advancing said predetermined number of work products upwardly along said inclined passage; and holding means for engaging with a rear end of the work group to hold the work group on the inclined passage when the predetermined number of work products are divided and quickly fed by the quick-feeding means.

7. The apparatus as claimed in claim 6, wherein a proximal portion of the at least one feeding part of the second machine, to which the work groups are fed by the robot system, is an inclined passage gradually descending toward a downstream side thereof.

8. The apparatus as claimed in claim 6, further comprising a storage site for arranging and storing the work groups to be freely taken out by the robot system, the storage site being provided between the feeding part of the second machine and the stay parts.

9. The apparatus according to claim 6, wherein said first machine comprises an even number of discharging parts connected respectively to said feeding paths, said second machine comprises a single feeding part, and said feeding paths are disposed generally parallel to said single feeding part such that said feeding paths are disposed symmetrically on respective sides of said single feeding part.

* * * * *